June 28, 1960

R. B. BENDER 2,943,140

WIRE SPLICE COVER

Filed July 30, 1956

RICHARD B. BENDER.
INVENTOR.

BY *Herbert J. Brown*

ATTORNEY

United States Patent Office 2,943,140
Patented June 28, 1960

2,943,140

WIRE SPLICE COVER

Richard B. Bender, Fort Worth, Tex., assignor to Worth Engineering and Development Company, a corporation of Texas Filed July 30, 1956, Ser. No. 601,007

3 Claims. (Cl. 174—93)

This invention relates generally to means for insulating the juncture of two electrical cable leads at the point of splice or connection and more particularly to means of insulating cable connections which do not employ the conventional rubber tape material.

The primary object of the invention is to provide a simple, economical and yet durable means of enclosing an electric cable splice juncture which has a minimum number of parts and which is easy and positive in use.

A second object is to provide a two-piece device which is easy to install over the free ends of two electric cables to be spliced, and which after splicing may be quickly engaged to provide a positive insulation for the splice.

A third object is to provide a device such as described which employs two telescoping parts which engage over the splice to completely and effectively insulate it from adjoining wires or devices.

Another object is to provide a simple two-piece device employing a close fitting telescoping engagement over an electric cable splice to form a corrosion barrier and prevent the entrance of moisture or vapor.

A still further object is to provide an insulating, watertight wire splice cover assembly which is made entirely of molded rubber or plastic material.

Another object of the invention is to provide a two-piece cover for a wire splice which is so configurated as to provide a watertight connection at its point of contact with each lead wire and at the point of contact of the two sections of the cover without requiring any mechanical tightening means whatever.

These and other objects and advantages will be apparent from an examination of the following specification and drawing in which.

Figure 1:
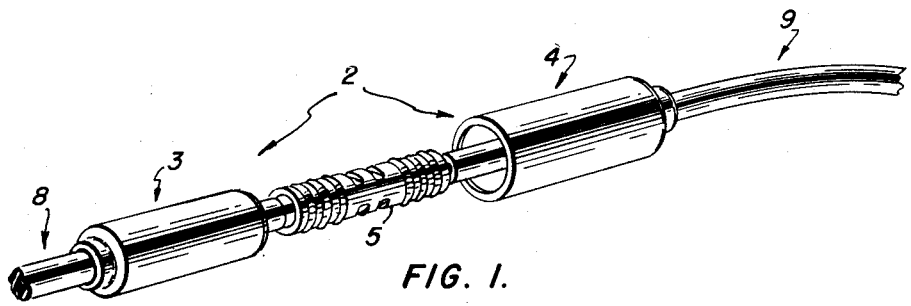
Figure 1 represents a pictorial view of the wire splice cover assembly of the invention in the operation of being installed over a conventional electric cable splice connector.
Figure 2:
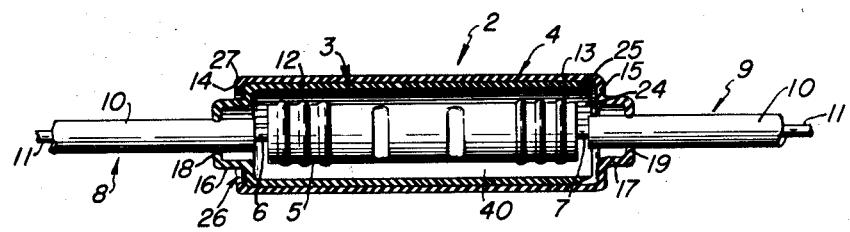
Figure 2 is a cross sectional elevational view of the assembled device of Figure 1.

Referring now more particularly to the characters of reference of the drawing, it will be observed in Figure 1 that the wire splice cover assembly of this invention, indicated generally at 2, includes only two separable parts, i.e., inside tube 3 and outside tube 4, which telescope together as shown in Figure 2 to completely enclose and seal off a wire splice connector 5. Connector 5 is a conventional connector for splicing two bare electrical wires 6 and 7 together in electrical conducting contact; one commercial connector of this type is widely known in the trade as a "Kearney" connector and is made of aluminum.

The electrical leads indicated generally at 8 and 9 each include heavy resilient insulation 10 surrounding a wire core 11, which is cut back to expose a workable length of bare wires 6 and 7 for splicing by means of connector 5. After splicing as shown in Figure 1, the two covers 3 and 4 which have been previously installed on the leads 8 and 9 may now be slid together in telescoping relationship as shown in Figure 2.

Figure 3:
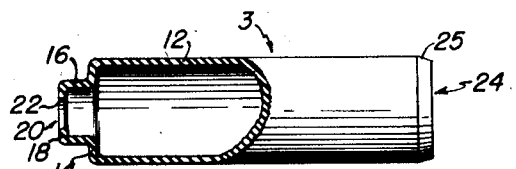
Figure 3 is a side elevational view, partly in fragmentary section, of the inside tube which forms the inner section of the telescoping cover assembly of Figure 2.
Figure 4:
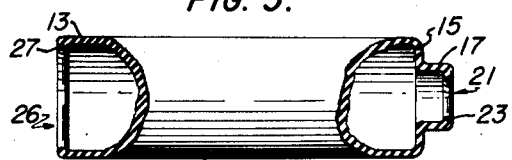
Figure 4 is a side elevational view partly in fragmentary section of the outside tube which forms the outer section of the telescoping cover assembly of Figure 2.

The configuration of the telescoping tubes 3 and 4 may best be seen in Figures 2–4 to include parallel concentric shells 12 and 13, respectively, which are integrally formed with flanges 14 and 15 which are in turn formed with reduced diameter hubs 16 and 17 outwardly thereof, which then join end flanges 18 and 19. Circular openings 20 and 21 are present in the end flanges 18 and 19, respectively, and the material adjacent the opening is rounded as at 22 and 23 to act as a ring seal when tightly engaging and compressing the outer surface of resilient insulation 10 at assembly. The end of the tube 3 adjacent the large opening 24 is bevelled as at 25 to facilitate its guided entry into opening 26 of tube 4 which is defined and surrounded by an O section 27. As seen in Figure 2, when tubes 3 and 4 are fully assembled, the O section 27 extends just beyond the flange 14 of tube 3 and laps over it in a manner to lock the two tubes in a secure and watertight engagement.

Figure 5:
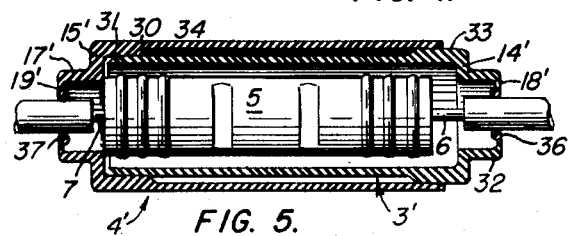
Figure 5 is an enlarged longitudinal cross sectional and elevational view of the assembled outside and inside tubes of a second embodiment of the cover assembly of the invention.

In the embodiment shown in Figure 5, corresponding parts of the wire splice cover assembly are identified by the prime numbers of the reference numbers of Figures 1–4. In this embodiment it will be seen that the outside tube 4' includes an internal ridge 30 which has a circular I.D. 31, and inside tube 3' includes an enlarged landing 32 which has a circular O.D. 33. Diameters 31 and 33 are so gauged as to require a hand pressed fit with the circumference 34 of tube 3' and the bore 35 of tube 4', respectively. The structure of flanges 14' and 15', hubs 16' and 17' correspond substantially similar to parts 14–17 of the first embodiment, however, end flanges 18' and 19' are made substantially thinner in cross section to corresponding end flanges 18 and 19, and the rounded circumferences 22 and 23 are replaced here by the O rings 36 and 37 which may be integrally molded with the remainder of covers 3' and 4' or may be a separate part as shown and bonded thereto.

One of the features of the configuration of both embodiments is best seen in Figure 5. The outer diameter of connector 5 is greater than the inner diameter of the hub 16' and the axial distance of the end of the connector to the inner side of flange 14' is so dimensioned that when connector 5 is at the position that its upper left edge has been stopped by flanges 14' the bare length of wire 6 is still completely within the housing formed by the hub 16' and therefore insulated and protected from any external conditions.

It is envisioned that the wire splice cover assembly of the invention will be formed of a slightly resilient plastic material, and in such construction even thin wall shells 12 and 13 will become sufficiently rigid to resist a substantial amount of bending and thus prevent the strain from being placed directly on the wire splice or connector 5. However, normally considered rigid material such as Bakelite may be used if the cross section dimensions are maintained sufficiently thin, as long as the material has insulating qualities. Under certain conditions it may be desirable to fill the interior cavity 40 with a high viscosity liquid insulating medium or plastic resin to prevent entrapping moisture vapor.

The invention is not limited to the construction herein shown and described, but may be made in many ways within the scope of the appended claims.

What is claimed is:

1. A cover for a cylindrical wire splice connector and adapted to grip the insulation of connected wires adjacent the ends of said connector, said cover being of resilient dielectric material and comprising: an outer tube, an inner tube telescopically received in said outer tube, integral inwardly directed flanges at opposite ends of said tubes, tubular hubs concentric with and extending outwardly from said flanges, the inside diameters of said hubs being less than the outside diameter of said cylindrical connector, inner flanges on the outer ends of said hubs, ring seals around the inner peripheries of said inner flange, and at least one circular ridge of resilient material on the inner surface of said outer tube, the inside diameter of said ridge being slightly less than the outside diameter of said inner tube.

2. A cover for a cylindrical wire splice connector and adapted to grip the insulation of connected wires adjacent the ends of said connector, said cover being of resilient dielectric material and comprising: an outer tube, an inner tube telescopically received in said outer tube, integral inwardly directed flanges at opposite ends of said tubes, tubular hubs concentric with and extending outwardly from said flanges, the inside diameters of said hubs being less than the outside diameter of said cylindrical connector, inner flanges on the outer ends of said hubs, ring seals around the inner peripheries of said inner flange, and at least one circular ridge of resilient material on the outer surface of said inner tube, the outside diameter of said ridge being slightly greater than the inside diameter of said outer tube.

3. A cover for a cylindrical wire splice connector and adapted to grip the insulation of the connected wires adjacent the ends of said connector, said cover being of resilient dielectric material and comprising: an outer tube, an inner tube telescopically received in said outer tube, the length of said outer tube being greater than the length of said inner tube, inwardly directed flanges at opposite ends of said tubes, tubular hubs concentric with and extending outwardly from said flanges, the inside diameters of said hubs being less than the outside diameter of said cylindrical connector, inner flanges on the outer ends of said hubs, the inner peripheries of said inner flanges being of less diameter than the diameter of the insulation of said wire, and a resilient ring section around the end of said outer tube opposite the end including its said hub, the inside diameter of said ring section being normally less than the outside diameter of said inner tube.

References Cited in the file of this patent

UNITED STATES PATENTS

| | | |
|---|---|---|
| 743,346 | Swain | Nov. 3, 1903 |
| 2,782,391 | Kirk | Feb. 19, 1957 |

FOREIGN PATENTS

| | | |
|---|---|---|
| 528,561 | Germany | July 1, 1931 |
| 573,920 | Great Britain | Dec. 12, 1945 |